United States Patent

[11] 3,623,621

| [72] | Inventor | Fred K. Tarrant, Sr.<br>Saratoga Springs, N.Y. |
|---|---|---|
| [21] | Appl. No. | 11,392 |
| [22] | Filed | Feb. 16, 1970 |
| [45] | Patented | Nov. 30, 1971 |
| [73] | Assignee | Tarrant Manufacturing Company |

[54] STORAGE SUPPORT FOR EQUIPMENT USED ON A DUMP TRUCK
8 Claims, 6 Drawing Figs.

[52] U.S. Cl. .............................................. 214/515
[51] Int. Cl. .............................................. B60p 1/64
[50] Field of Search .............................. 214/501, 515; 254/45

[56] References Cited
UNITED STATES PATENTS

| 3,261,488 | 7/1966 | Van Raden | 214/515 |
| 3,430,793 | 3/1969 | Chapman | 214/515 |

FOREIGN PATENTS

| 704,550 | 2/1954 | Great Britain | 214/515 |
| 783,130 | 9/1957 | Great Britain | 214/515 |
| 88,000 | 9/1956 | Norway | 214/515 |

*Primary Examiner*—Albert J. Makay
*Attorney*—Paul A. Frank

ABSTRACT: An arrangement for storing bulky equipment of the type installed and used on a dump truck and removed from the truck during nonuse periods consists of a support pivotally connected at the rear of the equipment and adapted to rest on the ground and a pair of front legs having transverse arms which fit in openings at the front of the equipment. The arms are inserted in the openings after the truck has raised the front of the equipment to an elevated position so that when the truck body is subsequently lowered the front legs engage the ground to maintain the equipment elevated above the dump truck and the truck can be moved forwardly leaving the equipment at rest, supported by the pivotal support and front legs.

Inventor
Fred K. Tarrant Sr.,
by Paul A. Frank
His Attorney

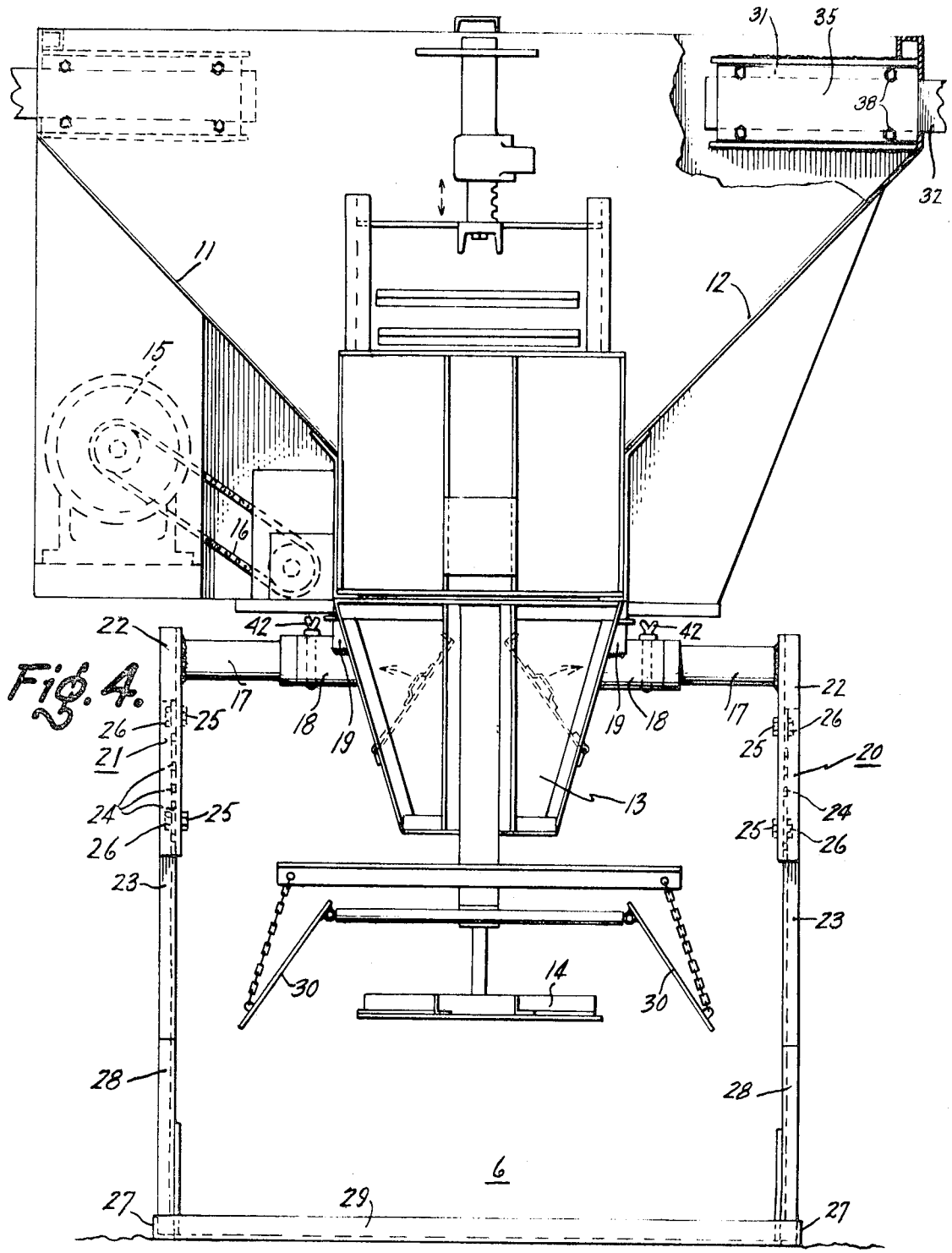

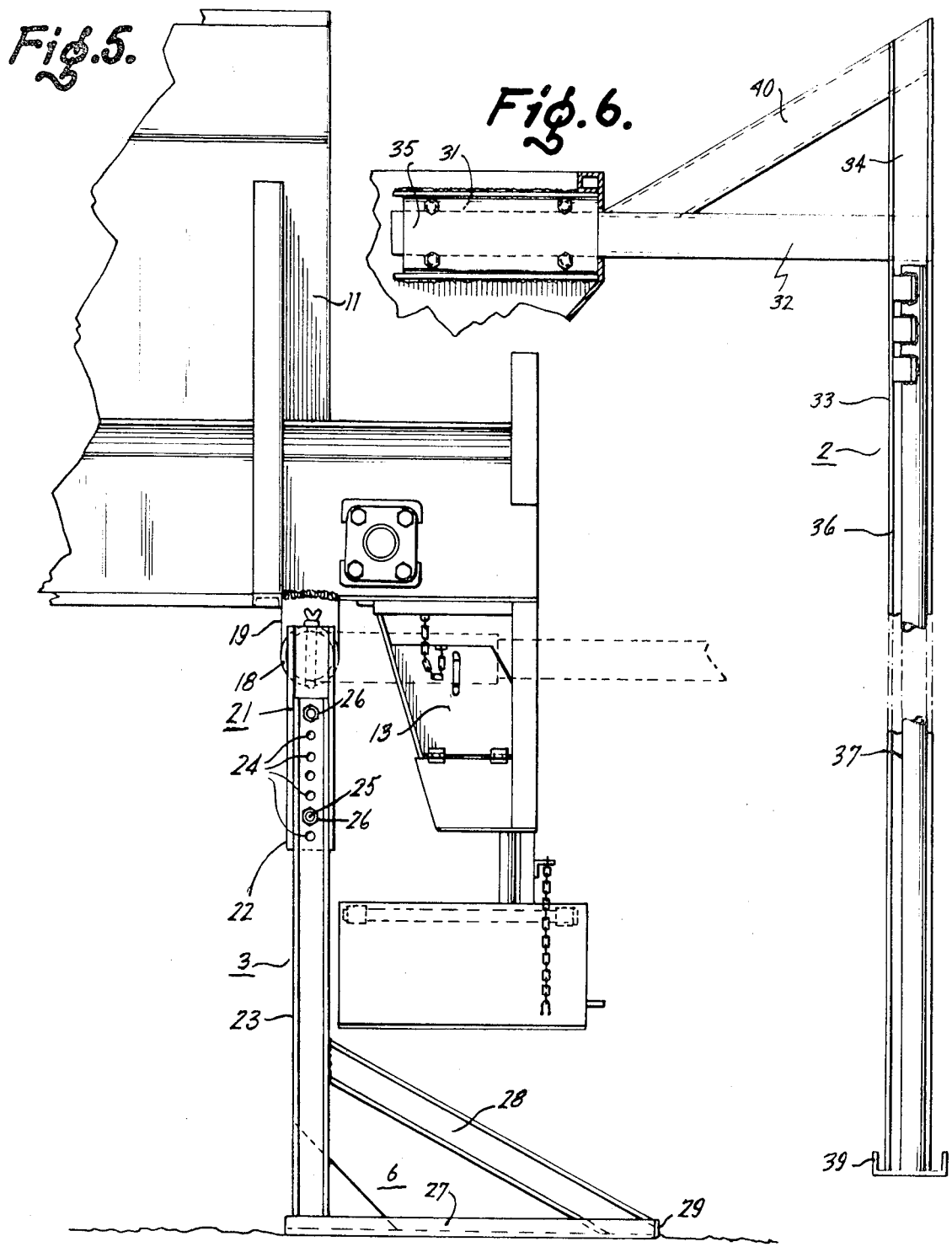

STORAGE SUPPORT FOR EQUIPMENT USED ON A DUMP TRUCK

My invention relates to equipment of the type which when in use is installed on or carried by a dump truck and removed from the truck during periods of nonuse and in particular to a support to facilitate removal of the equipment from the truck and provide storage of the equipment after such removal.

Many types of road building and maintenance equipment are normally installed on dump trucks and used seasonally during a few months only of the year. For example, material spreader hopper bodies are used during the winter months for spreading cinders, sand, salt, and similar materials on roadways. During the remaining months of the year it is customary for the user, such as a highway department, to remove the hopper bodies so that the trucks either alone or with a different type of equipment may be employed for other purposes, for example, hauling dirt and materials used in highway construction. Similarly, other types of equipment such as tank-type sprayers, leaf loaders, leaf receiver boxes, and numerous other devices used on dump trucks have periodic or seasonal use, and the dump truck owner periodically removes the equipment from the dump truck and employs the truck for other purposes to maximize its use. Removing such equipment from a dump truck and storing it during the nonuse seasons or periods has always been a problem for the user. The equipment usually is heavy and bulky, and lifting apparatus such as a crane is required to remove the equipment from the truck. After removal by a crane, the equipment is then placed on a support such as a dolly or on the ground and stored until it is subsequently needed.

It would be a great advantage to the user to be able to store the equipment at a location close to that of next use, such as in the case of a material spreader, for example, the materials which are to be spread on roads during the winter months. Likewise it would be a great advantage to the user to be able to obviate the need of either an overhead or a portable crane for removing the equipment from or installing it on the dump truck.

It is a primary object of my invention to provide a new and improved support for equipment of the type carried on a dump truck which obviates the need for cranes for installing the equipment on a dump truck or removing it from the truck.

It is another object of my invention to provide a new and improved arrangement for storing equipment of the type used on a dump truck which permits a single truck operator to install the equipment on a dump truck or remove it from the truck and place it in storage.

It is another object of my invention to provide a new and improved support for storing such equipment, the support being constructed of inexpensive, readily available materials.

In its broadest aspect my invention consists in providing at the rear of the equipment a pivotal support which is adapted to engage the ground as the equipment is elevated to a raised position and a pair of front legs having transverse arms which fit into openings provided at the front end of the equipment and which legs engage the ground as the truck body is lowered, the rear support and the pair of front legs providing a rigid, stable support for the equipment when the dump truck body is lowered to a nearly horizontal position so that the dump truck can be driven from beneath the equipment. An additional feature of the invention is that the rear support in its raised position can serve as a bumper or guard for the equipment, the pivotal connection of the rear support permitting maintaining the support in a raised position when it is not used for storage purposes.

While, as previously noted, my invention is applicable to numerous types of equipment that may be installed and used on dump trucks, for purposes of illustrating one of its numerous applications my invention will be described in connection with a material spreader hopper installed and used on a conventional dump truck. The features of my invention which I desire to protect herein are pointed out with particularity in the appended claims. The invention itself however both as to its organization and method of operation together with further objects and advantages thereof may best be understood by reference to the following description taken in connection with the accompanying drawings wherein like parts in each of the drawings are identified by the same character reference and wherein:

FIG. 4 is a rear elevation view, partly in section, of the storage support of my invention applied to a hopper body;

Figure 1:
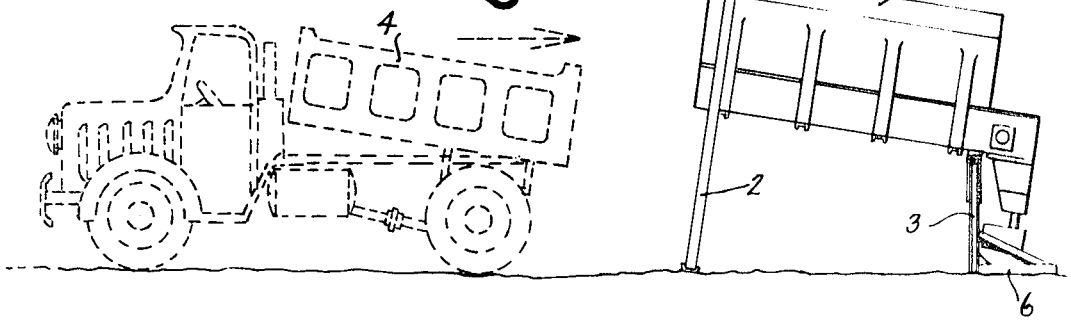
FIG. 1 is a side elevation view illustrating a storage arrangement of my invention for a material spreader hopper.

FIG. 5 is a side elevation view, partly in section, illustrating the rear portion of the storage support of my invention; and FIG. 6 is a view illustrating one of the front legs employed in the support of my invention. In FIG. 1 a hopper body type material spreader 1 of conventional construction is shown in a stored position and supported by a pair of front legs 2 and a support 3 pivotally connected at the rear of the hopper body. A conventional dump truck 4 is illustrated as moving to the right between the pair of front legs to receive the hopper body or equipment 1. A ground engaging platform 6 is attached to support 3 to provide a firm base for the rear end of the hopper body.

Figure 2:
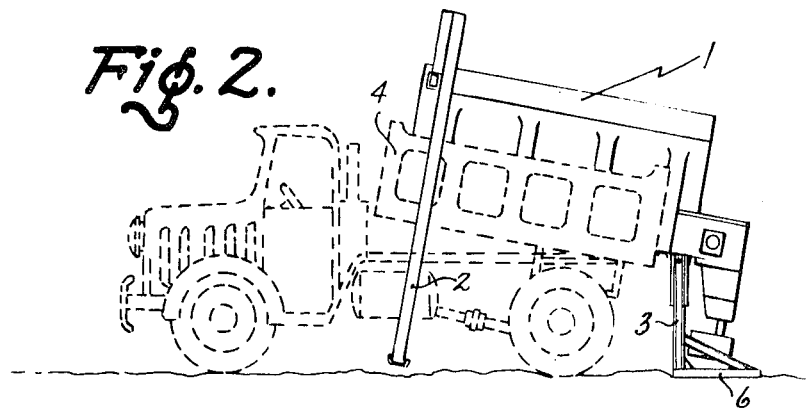
FIG. 2 illustrates a dump truck in position removing the hopper body from the storage support.

In FIG. 2 truck 4 has been moved beneath hopper body 1 and the dump truck body elevated to take the full weight of the hopper body and lift front legs 2 off the ground. In this position rear support 3 with platform 6 still engages the ground.

Figure 3:
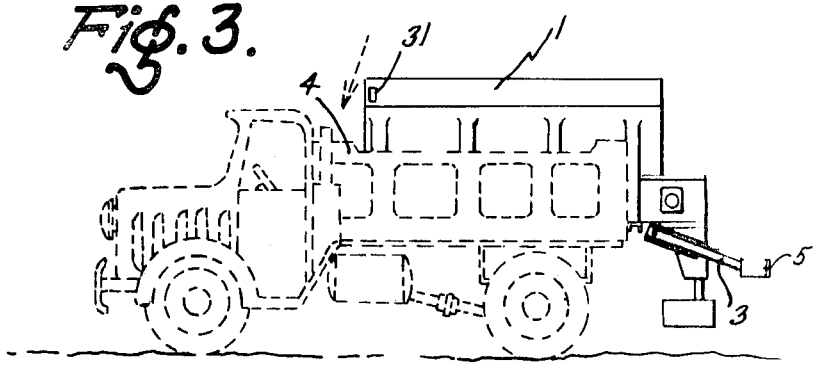
FIG. 3 illustrates the hopper body in normal operating position on a dump truck with the rear support of the storage arrangement of FIG. 1 in elevated position.

In FIG. 3 dump truck 4 is shown with the truck body lowered. In this position hopper body 1 is fully supported on the dump truck and is fastened or installed thereon in a conventional manner. This figure also shows the rear support 3 in an elevated position with a bumper 5 replacing the ground engaging platform 6 shown in FIGS. 1 and 2.

FIG. 4 illustrates the supported equipment, i.e., the hopper body, as comprising a pair of converging sidewalls 11, 12 which contain a material to be spread and which direct it to a conventional conveyor (not shown). A discharge chute 13 directs such material to a rotatable spreader 14. Such a hopper body usually includes a motor 15, which may be of the hydraulic type, to drive a chain 16 employed for operating the spreader.

The pivotal support 3 at the rear of the hopper body comprises a transverse member or shaft 17 which is journaled in a sleeve or bearing 18. Sleeve 18 in turn is welded to a plate 19 which is attached to the rear end of the hopper body as by bolting, welding, or in any other conventional manner. A pair of rear legs 20, 21 are connected to the two ends of shaft 17 as by welding, each leg comprising a pair of interfitting channels 22, 23. Outer channel 22 has a number of spaced holes or apertures 24 through which pass bolt and nut arrangements 25, 26 to secure inner channel 23 and adjust the length of the legs.

FIG. 5 illustrates how with this arrangement the lower end of channel 23 may be adjusted relative to the ground. The rearwardly extending ground engaging platform 6 attached to the rear legs comprises a channel 27 welded to the bottom of each channel 23 and a supporting channel 28 connected between the outer end of channel 27 and an intermediate point on channel 23. I also provide one or more transverse members 29 which may be either channels or angles connected between legs 20, 21 to maintain the legs in fixed spaced condition. The lengths of shaft or transverse member 17 and transverse members 29 are such that legs 20, 21 do not interfere with the opening of the deflectors 30 included with the spinner of spreader 14.

I also provide means for maintaining rear legs 20, 21 in an elevated position when support 3 is not being used. This means comprises pins 42 which may be inserted in cooperating holes provided in shaft 17 and journal 18. With this construction when rear platform 6 comprising channels 27, 28, and transverse members 29 attached to channels 23 is in a raised position, the entire platform may be removed by removing bolts 25, 26 and replaced by the guard or bumper 5 shown in FIG. 3. Thus the pivotal arrangement comprising shaft 17, journal 18 and legs 20, 21 not only provide means for supporting the rear end of the hopper body when it is removed from a dump truck but also provides an arrangement whereby a bumper guard is readily and easily attached to protect the spreading mechanism at the rear of the hopper body.

FIG. 6 illustrates one of the two front legs 2. Each leg comprises a vertical member 33, a transverse or horizontal arm 32, an angularly arranged strengthening member or strut 40, and a foot 39. Transverse arm 32 fits in an opening 31 near the top of the front end of the hopper body. Opening 31 may be formed by a piece of channel 35 which is welded or bolted to the front end of the supported equipment, in this case the hopper body. Preferably the configuration of transverse member 32 conforms with that of opening 31. Thus, if opening 31 is channel shaped then transverse arm 32 likewise preferably is a channel member, although both may have any matching configuration designed to provide rigid, stable support for the equipment. Vertical member 33 may be of fixed length or adjustable in length, if desired. AS shown, it comprises an upper portion 34 and a lower portion 36 formed by a single piece of channel and having foot 39 attached at its lower end. If desired, additional rigidity to leg 2 may be provided by a length of pipe 37 welded to foot 39 and lower portion 36. Of course, the leg may be of any suitable cross section such as circular or square, depending on the load to be supported.

In using my storage support the pivotally connected rear support 3 is lowered so that platform 6 engages the ground. Thereafter as the dump truck body is raised, the pivotal connection provided by members 17, 18 permits rotation at the rear end of the hopper while still maintaining rigid support of that rear end by means of platform 6 comprising members 27, 29, and legs 20, 21. As the body is raised the weight of the rear end of the hopper is transferred to legs 3 and platform 6. This effect is obtained by having the pivotal connection positioned slightly beyond the end of the dump truck. How this is achieved will vary with the equipment used. In FIG. 5, it is obtained by the extension plate 19 which carries bearing 18 and shaft 17. When the dump truck has been raised sufficiently high, transverse arms 32 of front legs 2 are inserted in openings 31 on the two sides of the hopper body. When these transverse arms have been fully inserted in the openings, the dump truck body is gradually lowered until feet 39 rest upon the ground and assume support for the front end of the hopper body. As the dump truck body is lowered toward a nearly horizontal position, platform 6 and feet 39 provide full support for the hopper. The truck 4 may now be driven forwardly leaving the hopper body fully supported by rear support 3 and the two front legs 2.

When it is desired to reinstall the hopper body upon the dump truck, the operations illustrated in FIGS. 1–3 are performed. For this purpose the length of the transverse arms 32 is such that when combined with the width of the hopper body their total length exceeds the width of the dump truck. The front legs therefore straddle the truck and permit the dump truck to be backed between the vertical front legs to a position directly below the suspended hopper body 1.

The dump truck is now raised until it is in full engagement with the hopper body. Upon further elevation of the dump truck body, the full weight of the hopper is placed upon the dump truck and feet 39 of legs 2 are raised above the ground. The front legs may now be removed by pulling transverse arms 32 from longitudinal openings 31. After these legs are removed the dump truck body is lowered to its horizontal position. Because of its connection to the hopper body through extension 19, rear support 3 may now be rotated to remove channels 27 from the ground and retaining pins 42 positioned in the holes provided in transverse member 17 and journal 18. If desired, ground engaging platform 6 may be removed and replaced by a bumper 5 of the type shown in FIG. 3.

The pivotal structure at the rear of the hopper body is an important advantage of my construction in that is not only provides a support for storing the body but also permits protecting discharge chute 13 and spinner assembly 14 from injury during normal use of the hopper body for spreading purposes. Such injury usually occurs when the truck is being backed to receive materials to be spread.

One of the principal advantages of my improved structure is that it eliminates the need for storage dollies. Another great advantage accrues from the fact that equipment used on a dump truck may now be stored wherever desired, for example, adjacent the materials to be used. Furthermore either installing the equipment on a dump truck or removing it from the truck may be done quickly by a single operator. In this manner when it is necessary to attach a hopper body to a dump truck for use in spreading salt or sand, the dump truck need merely be driven to the source of such materials and the hopper body, which is stored adjacent the materials, installed upon the dump truck by a single operator.

While I have shown a particular embodiment of my storage structure for a hopper body, it is apparent that it is applicable to other types of equipment carried on dump trucks and that modifications and variations in the structure shown are possible in the light of my above teaching. It is therefore to be understood that changes in structural elements may be made in the particular embodiment of my invention as described which are within the full intended scope of the invention as defined by the appended claims.

What I claim as new and desire to secure by Letters Patent of the United States is:

1. A storage structure for equipment of the type used periodically on a dump truck and removed from the truck and stored during nonuse periods comprising a support attached to the equipment at its rear for pivotable movement with respect thereto, said support being rotatable about its pivotal attachment from a first position in which it is substantially perpendicular to the ground to a second position in which it is elevated above the ground, said support having a length sufficient to engage the ground when the dump truck is in an unelevated position and a pair of removable front legs having transverse arms adapted to be inserted in and fit in locking, nonrotatable engagement with openings at the front of the equipment, said front legs having a length greater than the height of the equipment when the dump truck is in an unelevated position, whereby said arms may be inserted in said openings when the truck is elevated to a position such that the distance of the openings above the ground is greater than the length of the front legs and when the truck is lowered after the arms are so inserted said front legs engage the ground, and said rear support and said pair of front legs provide full support to the equipment as the truck body is further lowered toward a nearly horizontal position.

2. The storage structure of claim 1 in which both said openings and said transverse arms are channel shaped.

3. The storage structure of claim 1 in which said rear support comprises a pair of legs connected to a transverse member and said legs have transverse and rearwardly extending members connected thereto forming a ground engaging platform.

4. The structure of claim 3 in which each leg of said rear support comprises a pair of interfitting, separable channels, whereby when the legs are rotated on their pivotable support, said platform may be removed and replaced with a bumper.

5. The structure of claim 3 in which the pivotal attachment of the rear support includes means for locking the legs in an elevated position.

6. The structure of claim 1 in which the rear support may be adjusted vertically to permit use with equipment of different sizes.

7. The structure of claim 2 in which the lengths of the transverse arms are sufficiently great that the front legs straddle a dump truck permitting a truck to be moved relative to and between the front legs when they are providing full support for the equipment.

8. The structure of claim 1 in which the rear pivotal support is so attached to the equipment that it extends beyond the end to the truck body whereby as the truck body is raised the weight of the rear end of the equipment is transferred to the pivotal support.

* * * * *